United States Patent
Katz et al.

(10) Patent No.: US 9,683,888 B2
(45) Date of Patent: Jun. 20, 2017

(54) MEASUREMENT OF THE LIGHT RADIATION OF LIGHT-EMITTING DIODES

(71) Applicant: OSRAM Opto Semiconductors GmbH, Regensburg (DE)

(72) Inventors: Simeon Katz, Obertraubling (DE); Holger Specht, Bad Abbach (DE); Alexander Linkov, Regensburg (DE); Christopher Koelper, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 29 days.

(21) Appl. No.: 14/423,695

(22) PCT Filed: Aug. 22, 2013

(86) PCT No.: PCT/EP2013/067479
§ 371 (c)(1),
(2) Date: Feb. 24, 2015

(87) PCT Pub. No.: WO2014/029852
PCT Pub. Date: Feb. 27, 2014

(65) Prior Publication Data
US 2015/0204718 A1    Jul. 23, 2015

(30) Foreign Application Priority Data
Aug. 24, 2012   (DE) .................. 10 2012 215 092

(51) Int. Cl.
*G01J 1/00*   (2006.01)
*G01J 1/04*   (2006.01)
(Continued)

(52) U.S. Cl.
CPC ........... *G01J 1/0425* (2013.01); *G01J 1/0474* (2013.01); *G01J 1/42* (2013.01); *G01M 11/30* (2013.01); *G01J 2001/4252* (2013.01)

(58) Field of Classification Search
CPC ........ G01J 1/4257; G01J 9/00; G01M 11/061; G01M 11/064; G01M 11/06
(Continued)

(56) References Cited

U.S. PATENT DOCUMENTS 5,619,488 A * 4/1997 Ota .................... B41J 2/473
  369/112.26
6,144,787 A * 11/2000 Johnston ............. G02B 6/262
  385/117
(Continued)

FOREIGN PATENT DOCUMENTS

DE   3634597 A1   4/1988
DE   19826409 C2  7/2000
(Continued)

*Primary Examiner* — Tarifur Chowdhury
*Assistant Examiner* — Md M Rahman
(74) *Attorney, Agent, or Firm* — McDermott Will & Emery LLP

(57) ABSTRACT

The invention relates to a method for measuring a light radiation (300) emitted by a light-emitting diode (210). In the method, an end (121) of an optical fiber (120) which is connected to a measuring device (130) is irradiated with the light radiation (300), which is emitted by the light-emitting diode (210), through an optical device (140), so that a portion of the light radiation (300) is coupled into the optical fiber (120) and is guided to the measuring device (130). The optical device (140) causes the light radiation (300) passing through the optical device (140) to be emitted in diffuse form in the direction of the end (121) of the optical fiber (120).

(Continued)

The invention also relates to an apparatus (100) for measuring a light radiation (300) emitted by a light-emitting diode (210).

17 Claims, 4 Drawing Sheets

(51) Int. Cl.
*G01M 11/00* (2006.01)
*G01J 1/42* (2006.01)

(58) Field of Classification Search
USPC .................................................. 356/121
See application file for complete search history.

(56) References Cited

U.S. PATENT DOCUMENTS

| | | | | |
|---|---|---|---|---|
| 6,460,422 B1 * | 10/2002 | Kuroda | ............... | G01L 3/12 |
| | | | | 73/862.324 |
| 8,525,996 B2 * | 9/2013 | Cheng | ................ | G01J 3/51 |
| | | | | 356/418 |
| 2003/0147770 A1 | 8/2003 | Brown et al. | | |
| 2005/0002023 A1 * | 1/2005 | Kreh | ............... | G01N 21/9501 |
| | | | | 356/237.5 |
| 2006/0199144 A1 * | 9/2006 | Liu | ................ | A61C 19/004 |
| | | | | 433/29 |
| 2007/0196109 A1 * | 8/2007 | Al-Chalabi | ......... | H04B 10/505 |
| | | | | 398/140 |
| 2009/0021732 A1 | 1/2009 | Kolodin et al. | | |
| 2009/0236506 A1 | 9/2009 | Dudgeon et al. | | |
| 2011/0009737 A1 * | 1/2011 | Manstein | ............. | A61B 18/203 |
| | | | | 600/424 |
| 2011/0195531 A1 | 8/2011 | Sohn et al. | | |
| 2013/0335093 A1 * | 12/2013 | Bachmaier | ............ | G01R 31/44 |
| | | | | 324/414 |

FOREIGN PATENT DOCUMENTS

| | | |
|---|---|---|
| DE | 102005048685 A1 | 4/2007 |
| DE | 102009005552 A1 | 7/2010 |
| KR | 20050079616 A | 8/2005 |

\* cited by examiner

MEASUREMENT OF THE LIGHT RADIATION OF LIGHT-EMITTING DIODES

The present invention relates to a method and an apparatus for measuring a light radiation emitted by a light-emitting diode.

Typically, within production of light-emitting diodes (LEDs) tests are performed, in which the emitted light radiation is detected. Such light measurements take place in part at wafer level, that is to say in a method stage in which the light-emitting diodes are still located on a common carrier substrate (wafer).

In the case of a known measuring method, a free end of a optical fibre is located at a relatively large spaced interval above a wafer and a light-emitting diode located therebelow is activated for emitting a light radiation. A portion of the light radiation is coupled via the free end into the optical fibre and is guided further to a suitable measuring device. The measurement of all the light-emitting diodes is effected in groups, wherein by positioning the wafer, groups of light-emitting diodes are each arranged at a specified measuring position under the end of the optical fibre and the light-emitting diodes of each group are activated consecutively. The use of the optical fibre ensures that the light power emitted by the light-emitting diodes is measured only in a relatively small angular region (typically about 1 sr).

After a wafer has been singulated into individual LED chips, the chips are further processed, in particular they are cast in a casting material (e.g. silicone) and LED components which are produced in this manner are subsequently measured in a calibrated manner in a hollow sphere with a diffusely reflective inner side (a so-called Ulbricht sphere). In this case, relatively large deviations occur in part in comparison with the measurements conducted on a wafer. Depending upon the component, the deviations can result in yield losses and costs associated therewith. One cause for the deviations is different coupling-out of the light radiation, which in the event of measurements on a wafer can occur via the boundary surface from the thin-layer material of the light-emitting diodes (e.g. GaN) and air, and in the finished component via the boundary surface from the thin-layer material and the casting material.

A further cause is a different emission behaviour of light-emitting diodes, e.g. by reason of a different internal layer structure and/or a different roughening or surface structuring, which is provided for the purpose of coupling-out of light, on a light exit side. In combination with the small angular region which can be detected by the optical fibre, this can result in deviations or measurement errors in measurements conducted at wafer level. Further falsifications of measurements associated with the small angular region are e.g. the consequence of a different position of light-emitting diodes of a group in relation to the optical fibre, and are the consequence of a different reflection and shadowing of the light radiation.

In order to solve such problems, in particular to avoid deviations by reason of different emission characteristics, the so-called "partial flux measurement" can be conducted, in which in each case a larger proportion of the light radiation emitted by light-emitting diodes of a wafer is "collected". This can be effected with the aid of an Ulbricht sphere which, however, requires a corresponding calibration thereof. The reason for this is that the light radiation emitted by a light-emitting diode is reflected not only many times within the sphere but also many times at the wafer, giving rise to an influence which is dependent upon the surrounding of the light-emitting diode (wafer edge, dark fields such as e.g. adjustment fields, etc.). In order to correct the quality, a time-consuming auxiliary light measurement can be conducted for each light-emitting diode which, however, results in a considerable reduction of the measurement throughput.

The object of the present invention is to provide an improved solution for measuring a light radiation of a light-emitting diode.

This object is achieved by a method in accordance with claim 1 and by an apparatus in accordance with an additional independent claim. Further advantageous embodiments of the invention are described in the dependent claims.

In accordance with one aspect of the invention, a method for measuring a light radiation emitted by a light-emitting diode is proposed. In the case of the method, an end of an optical fibre is irradiated with the light radiation emitted by the light-emitting diode through an optical device. The optical fibre is connected to a measuring device. In this manner, a portion of the light radiation is coupled into the optical fibre and guided to the measuring device. The optical device causes the light radiation passing through the optical device to be emitted in diffuse form in the direction of the end of the optical fibre.

In contrast to the above-described conventional approach, according to which a free end of an optical fibre is irradiated directly with the light radiation emitted by a light-emitting diode, the method makes provision for the use of an optical device arranged between the light-emitting diode and the end of the optical fibre. The optical device thus connected upstream of the optical fibre influences the light radiation passing the optical device such that the light radiation is then emitted diffusely by the optical device. In other words, the light radiation emitted by the light-emitting diode is converted with the aid of the optical device into a diffuse light radiation. The optical device which can also be designated as a "diffuser" or "diffuser device" can be designed for example such that the light radiation is (chaotically) deflected or diffusely scattered in different directions.

In particular, the light radiation passes through a material of the optical device. The optical device can ensure in this manner that the light radiation which is emitted by the light-emitting diode is redistributed in a corresponding emission or angular region, in particular is spatially homogenised, before the light radiation enters the optical fibre (via the end thereof). For example, it is possible that the light radiation exiting the optical device follows substantially a Lambert radiation distribution. It is also possible that the light radiation follows another radiation distribution. The redistribution ensures that the portion of the radiation supplied to the optical fibre can comprise proportions from a (substantially) larger angular region. This applies in comparison with the conventionally conducted direct irradiation of an optical fibre, according to which there is a restriction to a small angular region around 0° (approximately a delta function).

The consideration of a larger angular region of the radiation renders it possible to suppress or at least (substantially) reduce the influence of a different emission behaviour, whereby the measurement of the light radiation or radiated power is more insensitive and more precise. In this manner, e.g. light-emitting diodes having different roughening or surface structuring can be compared directly to one another with a high degree of reliability even at wafer level. It is also possible to use the measuring method within the scope of optimising such coupling-out structures at wafer level. A further advantage resides in the fact that the method can be performed with the aid of a test apparatus which was hitherto used for light measurement and which is extended merely by the optical device. One use of an Ulbricht sphere, which is associated with disadvantages such as complex integration and time-consuming auxiliary light measurements, can be omitted in this case. As long as effects such as back-scattering or back-reflection can be avoided or disregarded, the measurement is also independent of an surrounding of the light-emitting diode in question.

Although the method cannot be used to correct deviations which can occur between a light-emitting diode, which is measured at wafer level, and the subsequent casted component (caused by a different coupling-out efficiency), it is possible to achieve an improved correlation between the measured radiated power or brightness of a "naked" light-emitting diode and the radiated power at the subsequent component.

In accordance with one embodiment, the optical device comprises a diffusion disk or the optical device is designed in the form of such a diffusion disk. In this case, it can be a relatively simply constructed and thereby cost-effective diffusion disk. The diffusion disk is designed to scatter the light radiation, which is emitted by the light-emitting diode, in different directions, in order to transmit the light radiation in diffuse form in the direction of the end of the optical fibre. For this purpose, the diffusion disk can be designed e.g. with a diffusely scattering, roughened surface. A further embodiment is a main body having scatter particles or scatter centres located therein, and/or a main body having a first refractive index and smaller bodies located therein having a second refractive index.

In a further embodiment, the optical device comprises a microlens array or is designed in the form of a microlens array. As a result, it is possible that no or only a relatively small amount of back-reflection and back-scattering of the light radiation occurs in the direction of the light-emitting diode, whereby the light measurement can possibly be influenced by the surrounding of the light-emitting diode. The microlens array is designed to deflect the light radiation emitted by the light-emitting diode in different directions, in order to transmit the light radiation in diffuse form in the direction of the end of the optical fibre. For this purpose, the microlens array can comprise a main body, the light entry and/or light exit side of which has a multiplicity of microlenses arranged thereon.

In a further embodiment, microlenses of the microlens array are arranged in a grid having a grid dimension in the range of 1 to 100 micrometers. The grid dimension can be dependent upon the lateral size of the light-emitting diode (or the associated layer sequence configured for light emission), and upon the spaced interval between the microlens array and the light-emitting diode. In particular, it can be provided that the microlenses are substantially smaller than the light-emitting diode, whereby a relatively uniform redistribution of the light radiation emitted by the light-emitting diode can be achieved.

In a further embodiment, the optical device comprises an antireflection layer. This embodiment which can be considered in particular for a microlens array offers the possibility of suppressing back-reflection of the light radiation to the light-emitting diode with a high degree of reliability.

In a further embodiment, the emitted light radiation which impinges upon the optical device and thereby passes through the optical device is emitted by the light-emitting diode at an emission angle in the region of 160°. As a result, it is possible that the light radiation which is diffusely emitted by the optical device and thus supplied to the optical fibre comprises radiation proportions from (substantially) the entire emission region of the light-emitting diode.

This can be favored by relatively close positioning of the optical device at the light-emitting diode. In a further embodiment, it is provided in this respect that the optical device is arranged at a spaced interval of several millimeters from the light-emitting diode. A possible spaced interval is e.g. 3 mm.

In order to permit simple handling, the end of the optical fibre can be arranged at a relatively large spaced interval with respect to the light-emitting diode (and thus with respect to the optical device). In a further embodiment, the end of the optical fibre is arranged at a spaced interval in a range of several tens of millimeters with respect to the light-emitting diode. A possible spaced interval can be e.g. 80 mm.

In a further embodiment, a collimation device is arranged in the region of the end of the optical fibre. In this manner, the end of the optical fibre can be irradiated with the light radiation, which is emitted by the light-emitting diode, through the optical device and through the collimation device. In this case, the collimation device can capture light radiation, which is emitted in diffuse form by the optical device, in a relatively large angular region and can pass said light radiation to the end of the optical fibre. As a result, it is possible to provide, instead of a small spaced interval, a relatively large spaced interval between the optical device and the light-emitting diode, wherein radiation proportions from a large or substantially the entire emission region of the light-emitting diode can continue to be supplied to the optical fibre. The provision of a large spaced interval between the optical device and the light-emitting diode promotes simple handling. The spaced interval can be e.g. in the range of 10 mm to 30 mm.

In a further embodiment, the light radiation of light-emitting diodes arranged next to one another on a carrier is measured. The measurement is effected in groups, wherein groups of light-emitting diodes to be measured are each measured in a specified measuring position. In the case of each group to be measured, the associated light-emitting diodes emit a light radiation consecutively. In the measuring position, the light-emitting diodes of the individual groups can be arranged directly below the end of the optical fibre. Furthermore, the light-emitting diodes of the individual groups can be contacted by an activation device which is used for activating the light-emitting diodes and which activates the light-emitting diodes of a group successively. The light radiation emitted consecutively in this manner can pass through the optical device in the manner described above and can pass (via the optionally provided collimation device) to the optical fibre. In this case, in contrast to the use of an Ulbricht sphere, the light-emitting diodes arranged on the carrier can be measured with a substantially higher throughput. The redistribution or homogenisation of the light radiation which can be achieved with the aid of the optical device also renders it possible to suppress measurement deviations or measurement errors, e.g. caused by a slightly different position of light-emitting diodes of one group in relation to the optical fibre, and different shadowing and reflection.

The carrier can be e.g. a common substrate disk, which is provided with the light-emitting diodes, or a wafer. The light-emitting diodes are (still) connected to one another via the wafer. Alternatively, a different carrier can also be provided. The carrier can be e.g. a separating foil, on which a substrate, which is provided with light-emitting diodes, for a singulating process is arranged. In this sense, the light-emitting diodes which are measured in groups and are arranged on the carrier can constitute singulated light-emitting diodes or LED chips.

In accordance with a further aspect of the invention, an apparatus for measuring a light radiation emitted by a light-emitting diode is proposed. The apparatus can be used to carry out the above-described method or the different embodiments thereof. The apparatus comprises an activation device for activating the light-emitting diode for emitting the light radiation, an optical fibre having a free end or an end provided for coupling-in of radiation, a measuring device which is connected to the optical fibre, and an optical device. The end of the optical fibre can be irradiated with the light radiation, which is emitted by the light-emitting diode, through the optical device, so that a portion of the light radiation can be coupled into the optical fibre and can be guided to the measuring device. The optical device is designed to emit the light radiation, which passes through the optical device, in diffuse form in the direction of the end of the optical fibre.

The use of the diffusely emitting optical device offers the opportunity of redistributing the light radiation, which is emitted by the light-emitting diode, locally in advance of the optical fibre or of achieving homogenisation of the radiation distribution. Consequently, the portion of the light radiation which is coupled into the optical fibre can include radiation proportions from a larger angular region. As a result, it is possible in particular to suppress or reduce the influence of a different emission behaviour of light-emitting diodes, thus rendering the light measurement more insensitive.

In one embodiment, the apparatus comprises a collimation device which is arranged in the region of the end of the optical fibre, so that the end of the optical fibre can be irradiated with the light radiation, which is emitted by the light-emitting diode, through the optical device and in addition through the collimation device. In such an embodiment, the optical device can be arranged at a relatively large spaced interval with respect to the light-emitting diode to be measured.

In a further embodiment, the apparatus is designed for measuring groups of light-emitting diodes which are arranged next to one another on a carrier (e.g. a wafer or separating foil). In this case, the apparatus comprises a holding device, with the aid of which the carrier with the light-emitting diodes can be held. Furthermore, by means of the holding device the carrier can be positioned in such a manner that a light-emitting diode group to be measured is arranged in a specified measuring position. The holding device can be designed e.g. in the form of a wafer chuck or can comprise such a wafer chuck. The activation device of the apparatus is designed to activate the light-emitting diodes of a light-emitting diode group, which is to be measured and is arranged in a measuring position, in a consecutive manner for emitting a light radiation. The activation device can comprise e.g. an arrangement of measuring needles which are attached to a holder and by means of which light-emitting diodes can be contacted on a front side.

The advantageous embodiments and developments of the invention, as explained above and/or described in the dependent claims can be used—except e.g. in the cases of unequivocal dependencies or incompatible alternatives—individually or else also in any combination together.

The above-described characteristics, features and advantages of this invention, and the manner in which they are achieved, can be more clearly and plainly understood in conjunction with the description hereinafter of exemplified embodiments which are explained in greater detail in conjunction with the schematic drawings, in which.

On the basis of the following figures, embodiments of a measuring method and an associated measuring apparatus 100 are described, with the aid of which light measurements can be conducted on light-emitting diodes 210, e.g. radiated power and lighting current measurements, with a high throughput. In particular, it is possible to eliminate or reduce the influence of different emission or directional characteristics of light-emitting diodes 210, whereby the measurements can be conducted with greater measuring precision.

Figure 1:
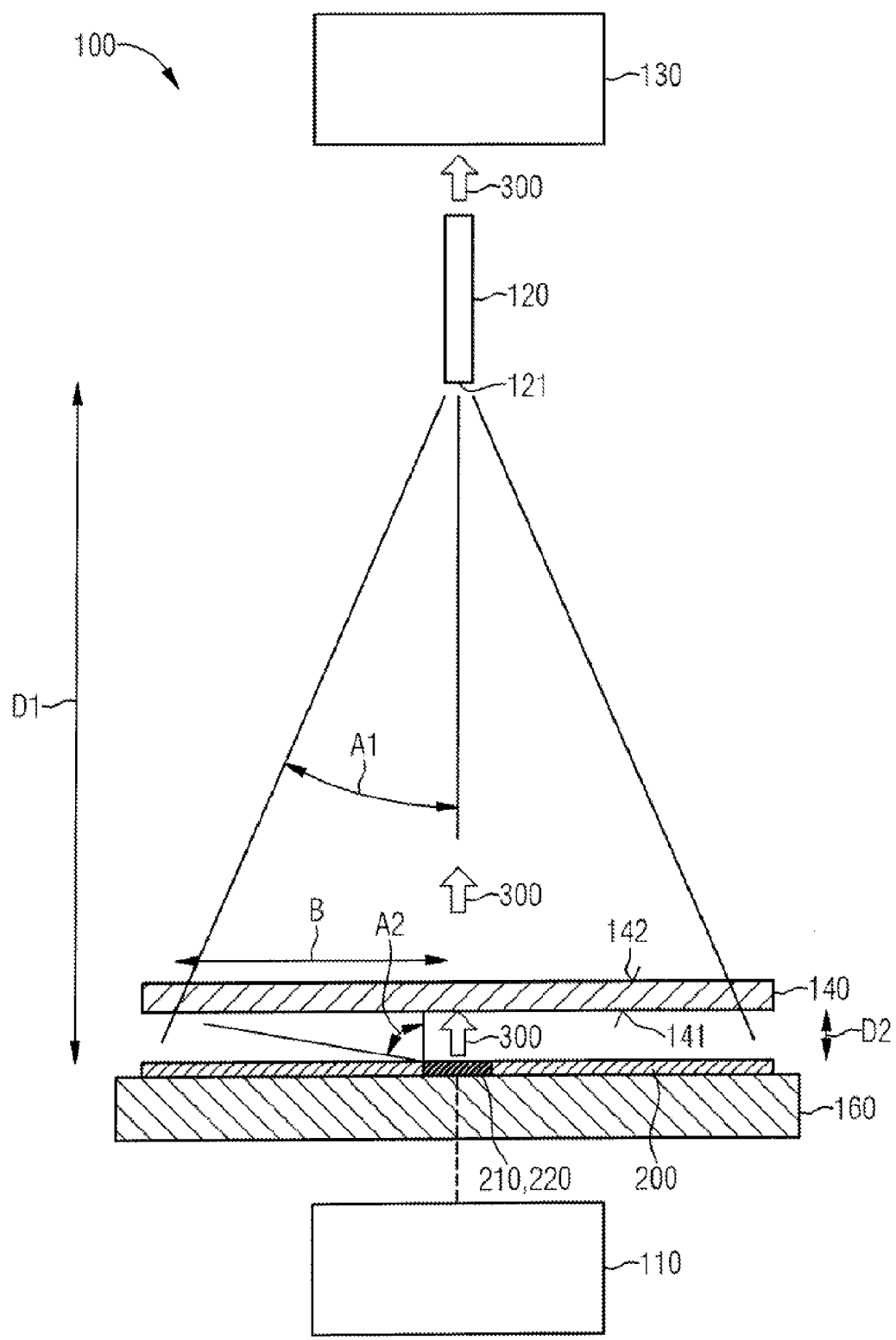
FIG. 1 shows an apparatus for measuring a light radiation emitted by light-emitting diodes, wherein the apparatus comprises a diffuser device for redistributing the light radiation.

FIG. 1 shows a schematic view of one embodiment of an apparatus 100, with the aid of which light-emitting diodes 210 arranged next to one another on a carrier 200 can be measured. The apparatus 100 which can also be defined as a "sampler" or "cluster sampler" is designed for measuring groups, that is to say that in each case groups 220 of light-emitting diodes 210 in a specified measuring position are subjected to a light measurement (cf. FIG. 2).

The carrier 200 can be e.g. a substrate disk or a wafer 200, wherein the light-emitting diodes 210 are arranged on a front side of the wafer 200. In this case, the light-emitting diodes 210 are (still) connected to one another via the wafer 200. In this regard, the apparatus 100 can be used for conducting light measurements at wafer level, i.e. in a stage prior to singulation of the wafer 200 into separate LED chips.

Figure 2:
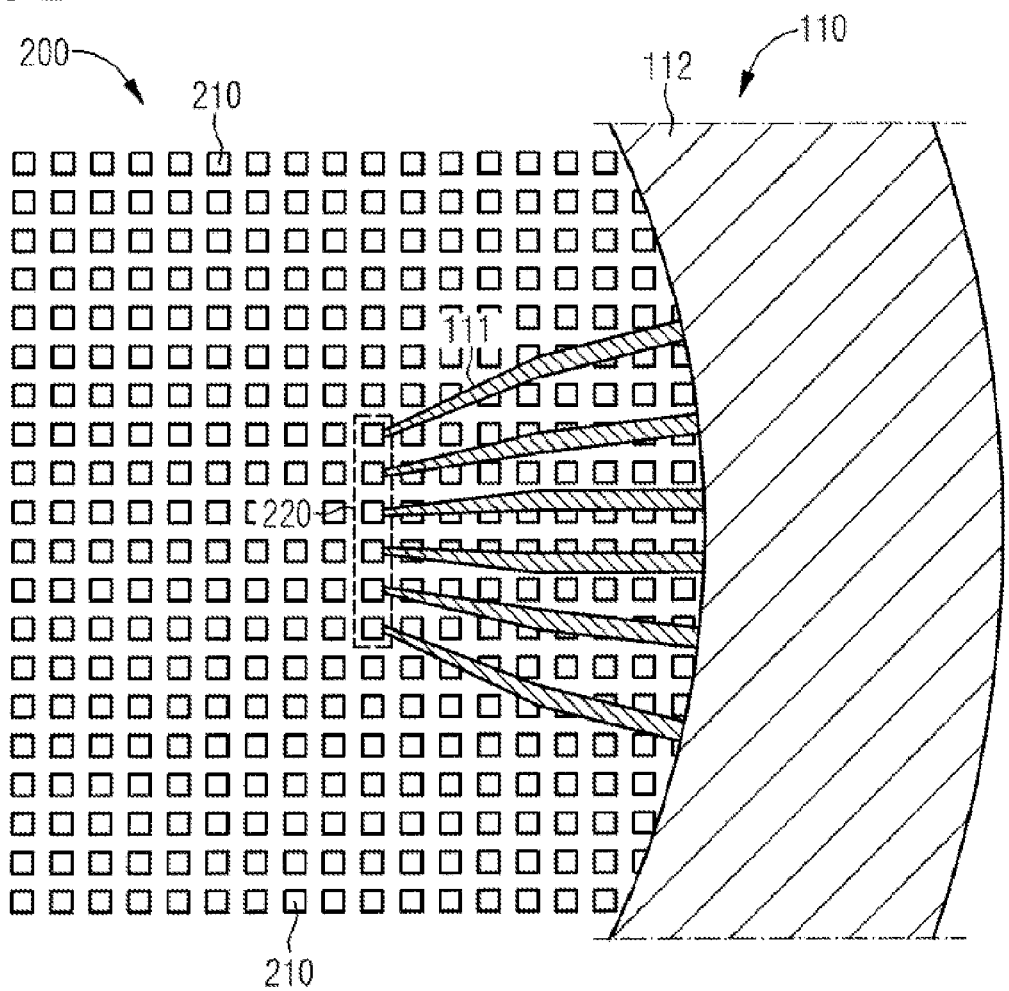
FIG. 2 shows a top view of a section of an arrangement of light-emitting diodes, wherein a group of light-emitting diodes to be measured are contacted with the aid of measuring needles of an activation device.

As illustrated in FIG. 1, the apparatus 100 comprises a holding device 160, on which the wafer 200 can be arranged and held. By means of the holding device 160, the wafer 200 can be moved to a position provided for a light measurement. In this manner, a group 220 of light-emitting diodes 210 can be moved to the specified measuring position. The top view of FIG. 2, in which sections of the front side of the wafer 200 are illustrated, illustrates this with a light-emitting diode group 220 indicated by a broken line. As illustrated in FIG. 2, such a group 220 can comprise a plurality (e.g. 6 in the present case) of light-emitting diodes 210 arranged next to one another in a line. After measurement of a light-emitting diode group 220, the wafer 200 can be moved or displaced with the aid of the holding device 160, whereby a further (in particular adjacent) group 220 can be moved to the measuring position and can be measured. In order to measure all the light-emitting diodes 210 of the wafer 200, this procedure is repeated many times. For such a mode of operation, the holding device 160 can be designed in particular in the form of a movable wafer chuck or can comprise such a wafer chuck.

As indicated in FIG. 1, the apparatus 100 also comprises an activation device 110, with the aid of which light-emitting diodes 210 can be contacted and activated by supplying current thereto for emitting a light radiation 300. The activation device 110 is designed to activate light-emitting diodes 210 of a group 220, which is moved to the measuring position, in a consecutive manner for emitting a light radiation 300.

For the light-emitting diodes 210 which can be measured with the apparatus 100, it can be provided that the light-emitting diodes 210 can be contacted both from a front side and a rear side. In relation to the rear side, the contacting can be effected via the holding device 160 or via a connection structure provided here which contacts the wafer 200 on a rear side located opposite to the front side. For front side-contacting, the activation device 110, as illustrated in FIG. 2, comprises a plurality of measuring needles 111 which are provided for contacting front side contacts of the light-emitting diodes 210 and are arranged on a circular ring-shaped holder 112. The arrangement of the holder 112 and measuring needles 111 can be included e.g. in a so-called "needle card" or "needle spider". According to the number of light-emitting diodes 210 of a group 220, six measuring needles 111 are provided in the illustrated embodiment. With the aid of the measuring needles 111, the light-emitting diodes 210 of a group 220 moved to the measuring position can be contacted separately and can be supplied with current consecutively for emitting a light radiation 300. The measuring needles 111 extend from the side to the relevant light-emitting diodes 210, in order that a light measurement, in which the light-emitting diodes 210 emit a light radiation 300 via the front side (or a light exit surface present in this case), is impaired to the least possible extent.

The apparatus 100 also comprises, as illustrated in FIG. 1, an optical fibre 120 and a measuring device 130 which is connected to the optical fibre 120 or is coupled to the optical fibre 120. The optical fibre 120 can be designed e.g. in the form of a glass fibre. An embodiment in the form of a light-conducting synthetic material fibre is also possible. The measuring device 130, with the aid of which the light radiation 300 emitted consecutively by the light-emitting diodes 210 of a group 220 is detected, can comprise e.g. a spectrometer, in particular a grating spectrometer. The measuring device 130 can be designed in particular for radiated power and lighting current measurements.

The optical fibre 120 comprises a free end 121 which is arranged at a spaced interval D1 above the wafer 200 (or the front side thereof) and via which a (small) portion of the light radiation 300 of a light-emitting diode 210 can be coupled into the optical fibre 120. The light radiation 300 coupled-in in this manner can be guided further to the measuring device 130 via the optical fibre 120. For the light measurement, a light-emitting diode group 220 which is moved to the measuring position is located directly below the end 121 of the optical fibre 120, as indicated in FIG. 1.

Instead of irradiating the free end 121 of the optical fibre 120, lying opposite to the wafer 200, directly with the light radiation 300 emitted consecutively by light-emitting diodes 210, the irradiation of the end 121 in the apparatus 100 as illustrated in FIG. 1 takes place through an optical device 140, through which the light radiation 300 (or a portion thereof) can be transmitted. The light radiation 300 passes through a material of the optical device 140. For this purpose, the optical device 140 is arranged between the wafer 200 and the end 121 of the optical fibre 120, and is located at a spaced interval D2 smaller than D1, e.g. relatively closely, above the wafer 200.

The optical device 140 which is defined hereinafter as a diffuser device 140 can be designed in the form of a planar, flat body. Contrary to the schematic view in FIG. 1, the diffuser device 140 can comprise smaller lateral dimensions than the wafer 200. During a light measurement, the diffuser device 140 is irradiated with the light radiation 300 at an entry side 141 opposite to the wafer 200, and the transmitted light radiation 300 can leave the diffuser device 140 at an opposed exit side 142 lying opposite to the end 121 of the optical fibre 120. It is possible for the diffuser device 140 to be integrated e.g. on the needle card which carries the measuring needles 111, and e.g. to be arranged on or attached to the holder 112.

The diffuser device 140 which is connected upstream of the optical fibre 120 is designed to influence the light radiation 300, which passes through, in such a manner that the light radiation 300 is emitted in diffuse form in the direction of the optical fibre 120. This can be effected by means of (chaotic) deflection of the light radiation 300 in different directions and/or diffuse scattering. As explained in greater detail hereinafter, the diffuser device 140 can be provided for this purpose e.g. in the form of a diffusion disk or in the form of a microlens array (cf. FIG. 3).

The use of the diffuser device 140 renders it possible to capture the light radiation 300 emitted by a light-emitting diode 210 in an emission or angular region and to redistribute said light radiation in a relatively uniform manner, before the light radiation 300 (or a portion thereof) can pass to the optical fibre 120 from where it can be guided to the measuring device 130. The emission region of a light-emitting diode 210 is indicated in FIG. 1 by a lateral emission angle A2 which relates to a surface normal of the wafer 200. Preferably, the optical device 140 effects possible spatial homogenisation of the light radiation 300. In this case, the radiation 300 emitted by the diffuser device 140 can follow substantially a Lambert radiation distribution or even a different radiation distribution.

This mode of operation renders it possible that the portion of the light radiation 300 or of the far field directed to the optical fibre 120 and thus to the measuring device 130 can include proportions of a relatively large angular region of the light radiation 300 emitted by a light-emitting diode 210, in particular substantially of the entire emission region of a light-emitting diode 210. This can be favored by positioning the diffuser device 140 relatively closely to the wafer 200. The detectable angular region is substantially larger than when the optical fibre 120 is irradiated directly (with an angular region around 0°).

A possible, maximum-detectable angular region of the radiation 300 is explained in greater detail hereinafter with the aid of an exemplary geometric observation. For the optical fibre 120, e.g. a numerical aperture NA of about 0.22 can be assumed. In accordance with $$A1 = \sin^{-1} NA$$

this gives a half opening angle A1 of the optical fibre 120 of about 13°, as indicated in FIG. 1.

For handling reasons, the optical fibre 120 or the end 121 thereof can be arranged in a range of e.g. several tens of millimeters (or even more) spaced apart from the wafer 200. In this case, a spaced interval D1 in the region of 80 mm is assumed. The diffuser device 140 or the entry side 141 thereof can be arranged relatively closely, e.g. in the range of several millimeters, to the wafer 200. In this case, a spaced interval D2 of 3 mm is taken as a basis.

A half irradiation region B (field of vision) on the diffuser device 140 is linked in the following manner to the other variables:

$$B = (\sin A1 / \cos A1) * (D1 - D2) \sim 18 \text{ mm}$$

This gives, for the lateral or half emission angle A2, the following:

$$A2 = \tan^{-1}(B/D2) \sim 80°.$$

Therefore, the diffuser device 140 can capture the portion of the light radiation 300 from a light-emitting diode 210, which portion of light radiation is emitted by the light-emitting diode 210 at an emission angle in the region of 160° (2*A2). In this case, (substantially) the entire emission region of the light-emitting diode 210 can be detected.

The detection of light radiation 300 from a large emission or angular region, which can be achieved with the aid of the diffuser device 140, offers a host of advantages. In particular, the influence of different emission profiles or directional characteristics of light-emitting diodes 210 can be suppressed or at least reduced. In this manner, light-emitting diodes 210 having a different emission behaviour, wherein the light-emitting diodes 210 are arranged e.g. on different carriers or wafers 200 to be measured, can be compared with one another. A different emission behaviour can be caused in particular by different roughening or surface structuring of the light exit side of the light-emitting diodes 210. Such structures which can be produced e.g. by means of etching or a lithographic structuring method are used for efficient coupling of the light radiation 300 out of the light-emitting diodes 210.

In a similar manner, the apparatus 100 which is equipped with the diffuser device 140 can be used e.g. for the purpose of reliably testing, as part of an optimisation procedure, the efficiency of such coupling-out structures on light-emitting diodes 210 of a carrier or wafer 200. When the optical fibre 120 is irradiated directly, this is impossible or possible only to a limited extent by reason of the comparatively small detectable angular region, or only an inadequate statement relating to the efficiency of a coupling-out structure can be provided.

The redistribution or homogenisation of the light radiation 300 also offers the opportunity to achieve an improved correlation between a measured radiated power or brightness of a "naked" light-emitting diode 210 and the radiated power at the subsequent LED component. The apparatus 100 can also be used to conducted measurements with a relatively high throughput. This is due to the fact that complex calibration measurements on individual light-emitting diodes 210, as can be conducted e.g. when using an Ulbricht sphere, can be omitted.

A light measurement conducted with the apparatus 100 can be substantially independent of the surrounding of a measured light-emitting diode 210 or group 220, which is the case in particular with negligible back-scattering or back-reflection of the light radiation 300 at the diffuser device 140. However, when such effects or even other effects occur, as described hereinafter, the redistribution of the radiation 300 which can be achieved with the aid of the diffuser device 140 can suppress or reduce an influence, which originates therefrom, upon a light measurement.

The light-emitting diodes 210 of a group 220 located in the measuring position have e.g. in each case a slightly different position in relation to the optical fibre 120 arranged in a positionally fixed manner with respect to the group 220. Furthermore, when light-emitting diodes 210 of a group 220 are activated in a manner conducted consecutively, the measuring needles 111 can produce different shadowing and light reflection. When the optical fibre 120 is irradiated directly, such effects can result in falsifications of a light measurement. For example, a measuring image which is obtained without the use of the diffuser device 140 and which images the radiated power of all the light-emitting diodes 210 of the wafer 200 can comprise strip-like measurement artefacts. This can be caused by measurement errors which can occur at the edge of a measurement group 220 during measurement of light-emitting diodes 210. The diffuser device 140 can prevent or reduce the influence of such effects.

A further advantage resides in the fact that the diffuser device 140 can be integrated into hitherto used measuring equipment in a relatively simple manner. In this regard, the illustrated apparatus 100 can be e.g. a conventional measuring apparatus which is fitted with the diffuser device 140 (which is designed e.g. to be interchangeable). In this case, the diffuser device 140 can be arranged on the needle card, as already stated above.

The diffuser device 140 can be e.g. a diffusion disk 140 which can effect diffuse scattering of the light radiation 300. In this case, it can be a diffusion disk 140 which is constructed in a relatively simple manner and is thereby cost-effective. The diffusion disk 140 can comprise a material, in particular a glass material, which is transmissible for light radiation 300, and in order to effect scattering, said diffusion disk can comprise e.g. a roughened surface on the entry side 141 and/or the exit side 142. In a further embodiment, the diffusion disk 140 can comprise a transmissible main body having scatter particles or scatter centres located therein. It is also possible to provide a main body having a first refractive index, in which smaller bodies or scatter bodies having a second refractive index, which differs from the first refractive index, are arranged.

Figure 3:
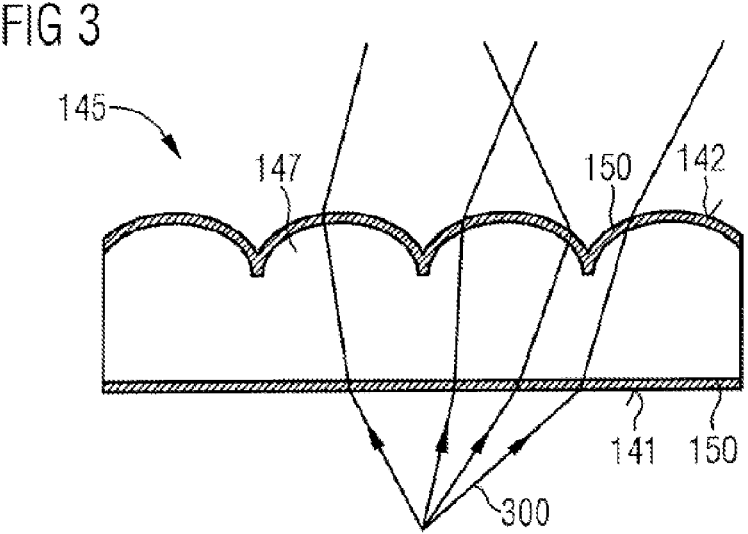
FIG. 3 shows a side view of a microlens array which can be used for redistributing light radiation.

FIG. 3 shows sections of a further possible embodiment of a diffuser device 140 which can be used in the device 100 and which is designed in the form of a microlens array 145. The microlens array 145 which comprises a material, in particular a glass material, which is transmissible for the light radiation 300, is provided in the form of a flat body, on the exit side 142 of which a multiplicity of convex microlenses 147 are arranged. In this manner, the light radiation 300 can be deflected or scattered in different directions, before the light radiation 300 (or a portion thereof) passes to the optical fibre 120. In contrast to a diffusion disk, the influence of back-scattering, and thus reflection characteristics in the surrounding of a light-emitting diode 210, can be largely avoided.

In terms of their lateral dimensions, the microlenses 147 of the microlens array 145 are substantially smaller than the light-emitting diodes 210 to be measured. In this manner, a relatively uniform redistribution of the light radiation 300, e.g. the attainment of a Lambert radiation distribution, can be favored. In this regard, the microlenses 147 can be arranged with respect to one another in a grid having a grid dimension in the range of 1 to 100 micrometers, e.g. 25 micrometers. The grid dimension is dependent upon the lateral size of the light-emitting diodes 210 and upon the spaced interval between the microlens array 145 and the light-emitting diodes 210 or the wafer 200.

The microlens array 145 also preferably comprises an antireflection layer 150 which, as illustrated in FIG. 3, can be formed in particular on both sides, that is to say on the (in this case flat) entry side 141 and also on the light exit side 142. The antireflection layer 150 which has a thickness which is adapted to the wavelengths of the light radiation 300 of the measured light-emitting diodes 210 renders it possible to suppress back-reflection of the light radiation 300 to a measured light-emitting diode 210 with a high degree of reliability. In this manner, the light measurement can be conducted in a relatively precise manner and in particular independently of the surrounding of the light-emitting diode 210. Instead of an embodiment where the antireflection layer 150 is arranged on both sides, the antireflection layer can also be arranged only on one of the two sides 141, 142.

In addition to the microlens array 145 illustrated in FIG. 3, other embodiments of a microlens array are also possible. For example, microlenses 147 can be present on the entry side 141, whereas the exit side 142 is flat, which can be accomplished e.g. by using the illustrated microlens array 145 in such a manner that it is inverted. It is also possible to have an embodiment in which microlenses 147 are present both on the entry side 141 and the exit side 142. Furthermore, it is feasible that instead of the illustrated convex microlenses 147, concave microlenses are provided (on one or both sides). For such embodiments, the aforementioned details (e.g. size of a grid dimension, antireflection layer on one or both sides) can apply analogously.

Figure 4:
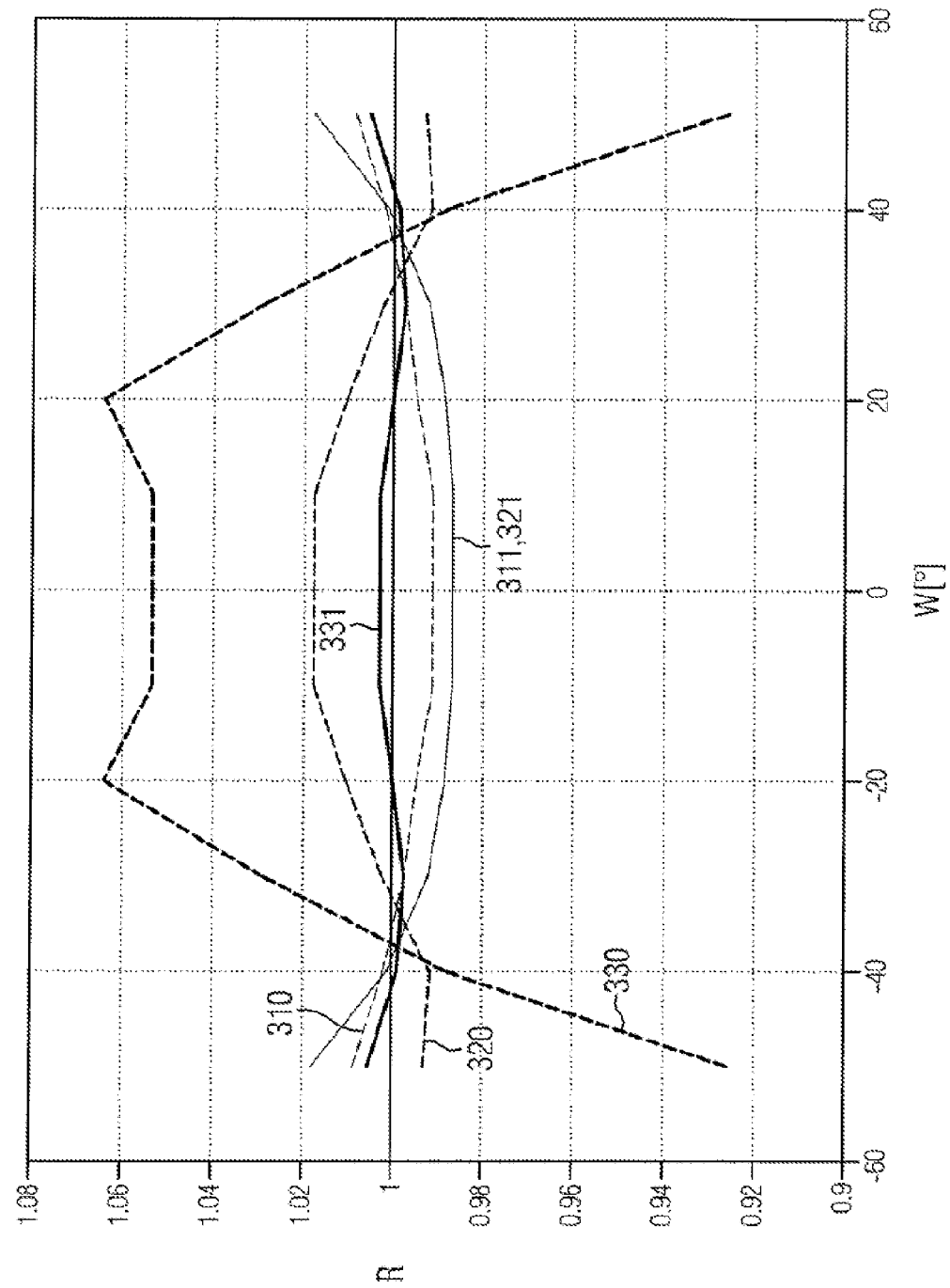
FIG. 4 shows measurement curves which are based upon measurements of different light-emitting diodes with and without the use of a diffuser device.

In order to exemplify the positive effect which can be achieved by using an optical diffuser device, FIG. 4 shows measurement curves which are based upon light measurements of three different light-emitting diodes with and without the use of a diffuser device. The diffuser device was arranged between the light-emitting diodes and an optical fibre used during the measurement. The diffuser device used was a relatively simple diffusion disk which comprises a curved contour. The three measured light-emitting diodes comprise differently formed surfaces or coupling-out structures provided in this case.

In each case, a relative deviation R from an ideal Lambert emitter is illustrated as a function of an emission angle W. The angle W relates to a surface normal of the light-emitting diodes and thus to a main beam direction. The "course" of the Lambert emitter is indicated in FIG. 4 by a line running constant at R=1. For the measurement, the optical fibre was moved in the form of a semicircle around the diodes, in order to measure the light radiation emitted at different angles W.

The measurement curves 310, 320, 330 are based upon measurements without the diffuser device and the measurement curves 311, 321, 331 are based upon measurements using this device. The measurement curves 310, 311 relate to a first diode, the measurement curves 320, 321 relate to a second diode and the measurement curves 330, 331 relate to a third diode. In particular, the measurement curves 320, 330 obtained without the diffuser device deviate to a relative large extent from the Lambert emitter. When the diffuser device is used, the deviation R, which can be identified from the measurement curves 321, 331, becomes (considerably) smaller. The curved form of the measurement curves 311, 321, 331 can be attributed to the curved form of the diffuser device used.

Figure 5:
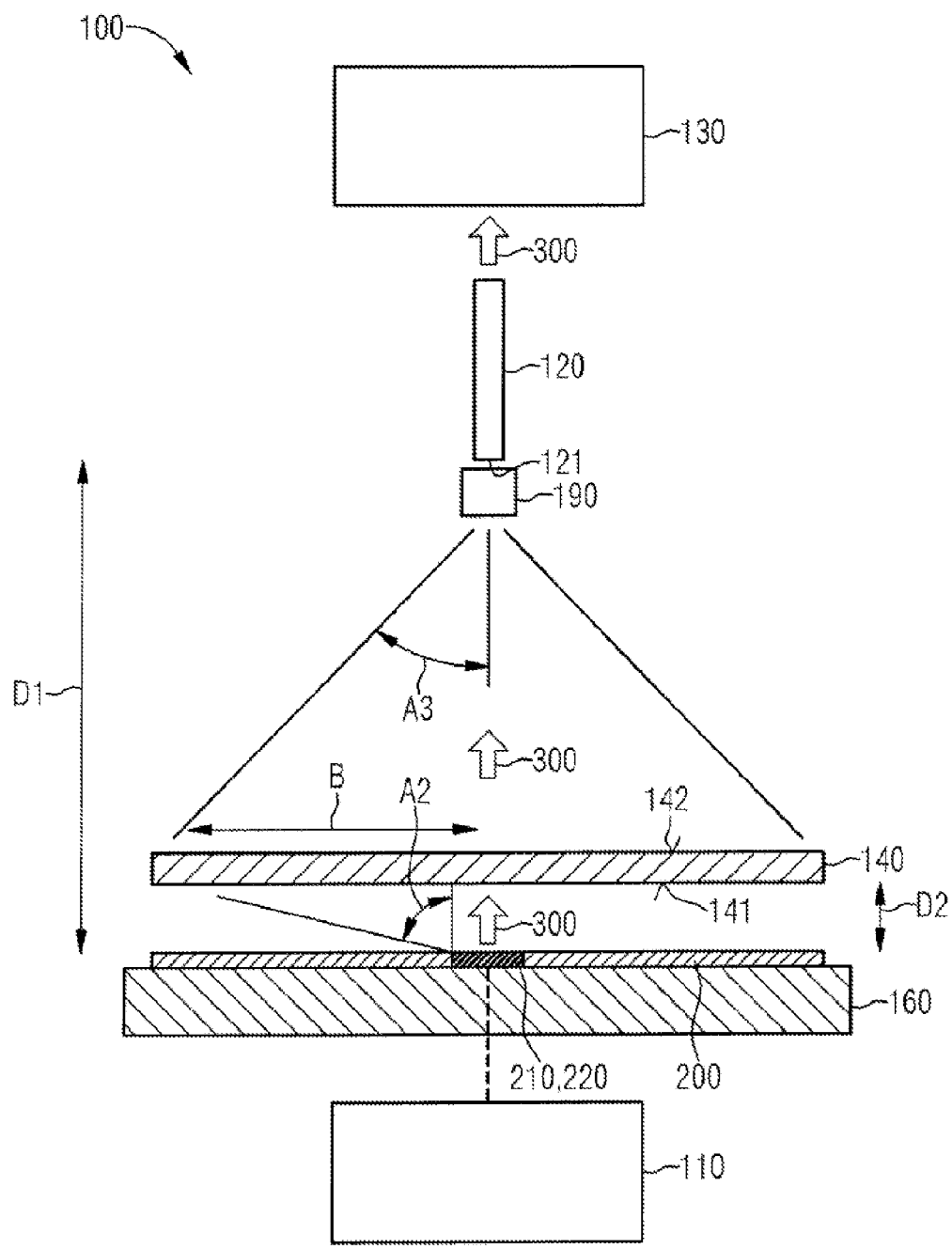
FIG. 5 shows a further apparatus for measuring a light radiation emitted by light-emitting diodes, which comprises an additional collimation device.

FIG. 5 shows a schematic view of an apparatus 100 in accordance with a further embodiment which comprises substantially the same structure and the same mode of operation as the apparatus 100 of FIG. 1. It is noted that with regard to the already described details relating to similar or corresponding components and features, possible advantages etc., reference is made to the statements above.

The apparatus 100 of FIG. 5 additionally comprises a collimation device 190 which is arranged in the region of the end 121 of the optical fibre 120. The collimation device 190 is arranged at a relatively small spaced interval with respect to the end 121 of the optical fibre 120 or is connected thereto. In this manner, the end 121 of the optical fibre 120 is irradiated through the diffuser device 140 and in addition through the collimation device 190.

The light radiation 300 which is emitted by the diffuser device 140 can be detected by the collimation device 190, which is arranged spaced apart from the diffuser device 140, in a relatively large angular region, and can be relayed to the end 121 of the optical fibre 120 or collimated. The collimation device 190 can include e.g. one or a plurality of lenses. The angular region which can be detected with the collimation device 190 is indicated in FIG. 5 by a (half) opening angle A3. The opening angle A3 of the collimation device 190 is (substantially) larger than the opening angle A1 of the optical fibre 120 indicated in FIG. 1.

The use of the collimation device 190 renders it possible to select the spaced interval D2 between the diffuser device 140 and the wafer 200 to be relatively large, whereby simple(r) handling can be achieved. The spaced interval D2 can be larger than in the case of the embodiment illustrated in FIG. 1. For example, the spaced interval D2 can be in the range between 10 mm and 30 mm.

The existence of a larger spaced interval D2 results in a larger (half) irradiation region B on the diffuser device 140 which is used for homogenisation of radiation. This is the case when the diffuser device 140, as indicated in FIG. 5, is irradiated once again with light radiation 300 of the (substantially) entire emission region (emission angle A2) of a light-emitting diode 210. In this regard, it is possible to design the diffuser device 140, in contrast to the embodiment of FIG. 1, with larger lateral dimensions. Owing to the use of the collimation device 190 with the available large opening angle A3, light radiation 300 from the larger irradiation region B can be detected and coupled into the end 121 of the optical fibre 120.

The embodiments explained with the aid of the figures constitute preferred or exemplary embodiments of the invention for measuring a light radiation or radiated power of light-emitting diodes. In addition to the described and illustrated embodiments, further embodiments are conceivable which can include further modifications and/or combinations of features.

In particular, materials stated above and numerical values stated above can be replaced by different statements. This relates e.g. to the geometry or statements, given in FIG. 1, relating to the spaced intervals D1, D2, the angles A1, A2, the irradiation region B etc. The grid dimension of a microlens array can e.g. also have a different size. Furthermore, an apparatus 100 can be designed such that a group 220 which is measured in a measuring position includes a different number of light-emitting diodes 210. In this regard, a needle card can also comprise a different number of measuring needles 111.

The spaced interval D1 between the end 121 of an optical fibre 120 and a measured light-emitting diode 210 (or an associated carrier 200) can be e.g. in a range of 50 mm to 200 mm. A possible spaced interval D1 is, as stated above, e.g. 80 mm, or even e.g. 100 mm. The spaced interval D2 between a diffuser device 140 and a light-emitting diode 210 (or a carrier 200) can be e.g. in a range of 2 mm to 30 mm. A possible spaced interval D2 is, as stated above, e.g. 3 mm, or even e.g. 5 mm. When a collimation device 190 is used, the spaced interval D2 can be larger. Furthermore, a diffuser device 140 can be irradiated with light radiation 300 which is emitted by a light-emitting diode 210 at an angle in a range of e.g. 40° to 170°.

The method or an associated apparatus 100 (and modifications thereof) can also be used for measuring light-emitting diodes 210 which are arranged on a different carrier 200 than a wafer. For example, this can be a separating foil 200 which is used when singulating light-emitting diodes 210. The light-emitting diodes 210 which can be measured with the apparatus 100 and are arranged on the separating foil 200 can therefore (already) constitute singulated light-emitting diodes 210 or LED chips. The above statements apply similarly to a separating foil 200 with light-emitting diodes 210.

Furthermore, an apparatus 100 can also be used for measuring light from light-emitting diodes 210 which, contrary to the description above, can be contacted exclusively via the front side. In this case, the light-emitting diodes 210 can each comprise two front side contacts. This can apply e.g. to light-emitting diodes 210 which are measured when arranged on a separating foil 200. In order to contact such light-emitting diodes 210, an activation device 110 having a needle card including measuring needles 111 can be used in a similar manner. In this case, a light-emitting diode 210 can be contacted on the front side by two measuring needles 111 or by "dual needles".

With regard to a diffuser device 140, it is feasible that said diffuser device comprises a curved shape instead of flat or planar shape illustrated in FIGS. 1 and 5. It is also possible that a diffuser device 140 provided as a diffusion disk is formed (on one or both sides) with an antireflection layer 150.

Furthermore, reference is made to the fact that it is possible that a light radiation which is diffusely emitted by a diffuser device 140 and is thereby redistributed can also follow a radiation distribution other than a Lambert radiation distribution, in order to suppress or at least reduce differences in the emission profile of light-emitting diodes.

Although the invention in detail has been illustrated and described more closely with the aid of possible or preferred exemplified embodiments, the invention is not limited by the disclosed examples and other variations can be deduced therefrom by the person skilled in the art without departing from the scope of protection of the invention.

This patent application claims the priority of German patent application 10 2012 215 092.7, the disclosure content of which is hereby incorporated by reference.

LIST OF REFERENCE NUMERALS 100 apparatus
110 activation device
111 measuring needle
112 holder
120 optical fibre
121 end
130 measuring device
140 diffuser device
141 entry side
142 exit side
145 microlens array
147 microlens
150 antireflection layer
160 holding device
190 collimation device
200 wafer/separating foil
210 light-emitting diode
220 group
300 light radiation
310, 311 measurement curve
320, 321 measurement curve
330, 331 measurement curve
A1 opening angle
A2 emission angle
A3 opening angle
B irradiation region
D1 spaced interval
D2 spaced interval
R relative deviation
W angle

The invention claimed is:

1. A method for measuring a light radiation emitted by a plurality of light-emitting diodes,
    wherein the light radiation from the light-emitting diodes is measured in groups and the light-emitting diodes of the groups to be measured are consecutively activated to emit light radiation,
    wherein an end of an optical fiber which is connected to a measuring device is irradiated with the light radiation, which is emitted by one of the groups of the light-emitting diodes, through an optical device, so that a portion of the light radiation is coupled into the optical fiber and is guided to the measuring device,
    wherein the optical device is formed as a diffuser device and is arranged between the group of light-emitting diodes and the end of the optical fiber,
    wherein the diffuser device is connected upstream of the optical fiber and is configured to influence the light radiation, which passes through the diffuser device, such that the light radiation is emitted in diffuse form in a direction of the end of the optical fiber,
    wherein a first interval between the end of the optical fiber and the light-emitting diode is in a range of 50 mm to 200 mm,
    wherein a second interval between the diffuser device and the light-emitting diode is in a range of 2 mm to 30 mm,
    wherein an activation device is used for activating the light-emitting diodes of the group to be measured, the activation device comprising a plurality of measuring needles which are provided for contacting the light-emitting diodes of the group to be measured,
    wherein the light-emitting diodes of different groups to be measured are contacted separately by the measuring needles and are supplied with current consecutively for emitting a light radiation, and
    wherein the measuring needles extend from the side to the relevant light-emitting diodes.

2. The method according to claim 1, wherein the optical device comprises an entry side and an exit side located opposite to the entry side, and
    wherein the optical device is irradiated with the light radiation on the entry side and the light radiation transmitted through the optical device exits the optical device on the exit side.

3. The method according to claim 1, wherein the optical device comprises a microlens array.

4. The method according to claim 3, wherein microlenses of the microlens array are arranged in a grid having a grid dimension in the range of 1 to 100 micrometers.

5. The method according to claim 1, wherein the optical device comprises an antireflection layer.

6. The method according to claim 5, wherein the optical device comprises an entry side, and
    wherein the optical device is irradiated with the light radiation on the entry side and the entry side comprises the antireflection layer.

7. The method according to claim 1, wherein the light radiation passing through the optical device is emitted by the group of light-emitting diodes at an emission angle in the region of 160°.

8. An apparatus for measuring a light radiation emitted by a plurality of light-emitting diodes, wherein the light radiation from the light-emitting diodes is measured in groups and the light-emitting diodes of the groups to be measured are consecutively activated to emit light radiation, comprising:
- an activation device for activating one of the groups of the light-emitting diodes for emitting the light radiation, an optical fiber having an end, a measuring device connected to the optical fiber, and an optical device,
- wherein the end of the optical fiber can be irradiated with the light radiation, which is emitted by the group of light-emitting diodes, through the optical device, so that a portion of the light radiation can be coupled into the optical fiber and can be guided to the measuring device, and
- wherein the optical device is formed as a diffuser device and is arranged between the group of light-emitting diodes and the end of the optical fiber,
- wherein the diffuser device is connected upstream of the optical fiber and is configured to influence the light radiation, which passes through the diffuser device, such that the light radiation is emitted in diffuse form in a direction of the end of the optical fiber,
- wherein a first interval between the end of the optical fiber and the light-emitting diode is in a range of 50 mm to 200 mm,
- wherein a second interval between the diffuser device and the light-emitting diode is in a range of 2 mm to 30 mm,
- wherein the activation device comprises a plurality of measuring needles which are provided for contacting the light-emitting diodes of the group to be measured,
- wherein the light-emitting diodes of different groups to be measured are contacted separately by the measuring needles and are supplied with current consecutively for emitting a light radiation, and
- wherein the measuring needles extend from the side to the relevant light-emitting diodes.

9. The apparatus according to claim 8, wherein the optical device comprises an entry side and an exit side located opposite to the entry side, and
- wherein the optical device is irradiated with the light radiation on the entry side and the light radiation transmitted through the optical device exits the optical device on the exit side.

10. The apparatus according to claim 8, wherein the optical device comprises a diffusion disk.

11. The apparatus according to claim 8, wherein the optical device comprises a microlens array.

12. The apparatus according to claim 11, wherein microlenses of the microlens array are arranged in a grid having a grid dimension in the range of 1 to 100 micrometers.

13. The apparatus according to claim 8, wherein the optical device comprises an antireflection layer.

14. The apparatus according to claim 13, wherein the optical device comprises an entry side, and
- wherein the optical device is irradiated with the light radiation on the entry side and the entry side comprises the antireflection layer.

15. The apparatus according to claim 8, further comprising a collimation device which is arranged in the region of the end of the optical fiber.

16. The apparatus according to claim 8, wherein the plurality of light-emitting diodes are arranged next to one another on a carrier, wherein the apparatus comprises a holding device for holding the carrier with the light-emitting diodes and for arranging the groups of light-emitting diodes.

17. A method for measuring a light radiation emitted by a plurality of light-emitting diodes arranged next to one another on a common carrier,
- wherein the light radiation from the light-emitting diodes is measured in groups and the light-emitting diodes of the groups to be measured are consecutively activated to emit light radiation,
- wherein a free end of an optical fiber which is connected to a measuring device is irradiated with the light radiation, which is emitted by one of the groups of the light-emitting diodes, through an optical device, so that a portion of the light radiation is coupled into the optical fiber and is guided to the measuring device,
- wherein the optical device is formed as a diffuser device which is arranged between the group of light-emitting diodes and the free end of the optical fiber,
- wherein the diffuser device is connected upstream of the optical fiber and is configured to influence the light radiation, which passes through the diffuser device, such that the light radiation is emitted in diffuse form in a direction of the free end of the optical fiber, the free end of the optical fiber being irradiated directly by light emitted in diffuse form,
- wherein a first interval between the end of the optical fiber and the group of light-emitting diodes is in a range of 50 mm to 200 mm,
- wherein a second interval between the diffuser device and the group of light-emitting diodes is in a range of 2 mm to 30 mm,
- wherein an activation device is used for activating the light-emitting diodes of the group to be measured, the activation device comprising a plurality of measuring needles which are provided for contacting the light-emitting diodes of the group to be measured, wherein the light-emitting diodes of different groups to be measured are contacted separately by the measuring needles and are supplied with current consecutively for emitting a light radiation, and
- wherein the measuring needles extend from the side to the relevant light-emitting diodes.

* * * * *